United States Patent
Sun et al.

(10) Patent No.: US 10,983,857 B2
(45) Date of Patent: Apr. 20, 2021

(54) CONTINUING A RUNNING SCRIPT AFTER MODIFICATION

(71) Applicant: International Business Machines Corporation, Armonk, NY (US)

(72) Inventors: Hong Wei Sun, Beijing (CN); Zhan Peng Huo, Beijing (CN); Si Er Han, Xi'an (CN); Xing Xing Shen, Beijing (CN); Dian BJ Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 208 days.

(21) Appl. No.: 16/171,943

(22) Filed: Oct. 26, 2018

(65) Prior Publication Data

US 2020/0133762 A1    Apr. 30, 2020

(51) Int. Cl.
| | |
|---|---|
| *G06F 11/00* | (2006.01) |
| *G06F 11/07* | (2006.01) |
| *G06F 11/36* | (2006.01) |
| *G06F 11/34* | (2006.01) |
| *G06F 8/70* | (2018.01) |

(52) U.S. Cl.
CPC ............ *G06F 11/0793* (2013.01); *G06F 8/70* (2013.01); *G06F 11/3414* (2013.01); *G06F 11/3664* (2013.01)

(58) Field of Classification Search
CPC ............ G06F 11/0793; G06F 11/3414; G06F 11/3664; G06F 11/368; G06F 8/70; G06F 8/71
See application file for complete search history.

(56) References Cited

U.S. PATENT DOCUMENTS 6,101,327 A *  8/2000  Holte-Rost ........ H04Q 3/54516
                                                717/170
6,269,442 B1*  7/2001  Oberhauser ............. G06F 8/656
                                                    713/1
(Continued)

FOREIGN PATENT DOCUMENTS

CN       104850802 A       8/2015
CN       105446805 A       3/2016

OTHER PUBLICATIONS

"What happens if you edit a script during execution?" Unix & Linux Stack Exchange Forum, URL: https://unix.stackexchange.com/questions/88487/what-happens-if-you-edit-a-script-during-execution, Aug. 28, 2013. Retrieved Jun. 26, 2018.

(Continued)

*Primary Examiner* — Philip Guyton
(74) *Attorney, Agent, or Firm* — Cantor Colburn LLP; Teddi Maranzano

(57) ABSTRACT

A computer-implemented method includes detecting that a first script has been modified to an updated script and that the first script is currently running. A data key point is selected from among a set of data key points available in the first script. At the selected data key point in the first script, a current state of the first script is saved in a storage object external from the first script, responsive to detecting that the first script has been modified. An execution point is selected in the updated script. The current state of the first script is loaded into the updated script. The updated script is run from the execution point, with the current state of the first script.

17 Claims, 4 Drawing Sheets

(56) References Cited

U.S. PATENT DOCUMENTS

| | | | | |
|---|---|---|---|---|
| 6,330,716 B1* | 12/2001 | Oberhauser | ............. | G06F 8/656 |
| | | | | 717/171 |
| 8,555,271 B2* | 10/2013 | Sprigg | ...................... | G06F 8/65 |
| | | | | 717/169 |
| 8,997,047 B2* | 3/2015 | Follis | ........................ | G06F 8/71 |
| | | | | 717/122 |
| 2010/0325492 A1* | 12/2010 | Isaacs | ................. | G06F 11/3684 |
| | | | | 714/38.1 |
| 2014/0157232 A1 | 6/2014 | Li | | |
| 2015/0331779 A1* | 11/2015 | Subramaniam | ....... | G06F 11/368 |
| | | | | 717/124 |
| 2016/0328308 A1 | 11/2016 | Pywell | | |
| 2019/0205120 A1* | 7/2019 | Sheedy | ............... | G06F 3/04842 |

OTHER PUBLICATIONS

IBM Corporation, "Method and system to debug shell scripts in a test environment," IP.com: IPCOM000180648D. Mar. 13, 2009. URL: https://priorart.ip.com/IPCOM/000180648, Retrieved Jun. 26, 2018.

* cited by examiner

continued on next page …

CONTINUING A RUNNING SCRIPT AFTER MODIFICATION

BACKGROUND

The present invention relates to scripts and, more specifically, to continuing a running script after modification.

Scripts are often used for long-term jobs, such as performance testing or stress testing. In such cases, for example, a script is used to present numerous scenarios to a system being tested. However, during a long-term job, a user, such as a tester or a system administrator, may wish to modify the script. This may be the case, for example, to change a function of the script based on observations of the script's current run. Typically, after modifying the script to a new version, the user will want the new version of the script to go into effect right away. Thus, the user stops the running version and runs the new version in its place.

SUMMARY

Embodiments of the present invention are directed to a computer-implemented method for continuing a running script after modification. A non-limiting example of the computer-implemented method includes detecting that a first script has been modified to an updated script and that the first script is currently running. A data key point is selected from among a set of data key points available in the first script. At the selected data key point in the first script, a current state of the first script is saved in a storage object external from the first script, responsive to detecting that the first script has been modified. An execution point is selected in the updated script. The current state of the first script is loaded into the updated script. The updated script is run from the execution point, with the current state of the first script.

Embodiments of the present invention are directed to a system for continuing a running script after modification. A non-limiting example of the system includes a memory having computer-readable instructions and one or more processors for executing the computer-readable instructions. The computer-readable instructions include detecting that a first script has been modified to an updated script and that the first script is currently running. Further according to the computer-readable instructions, a data key point is selected from among a set of data key points available in the first script. At the selected data key point in the first script, a current state of the first script is saved in a storage object external from the first script, responsive to detecting that the first script has been modified. An execution point is selected in the updated script. The current state of the first script is loaded into the updated script. The updated script is run from the execution point, with the current state of the first script.

Embodiments of the invention are directed to a computer-program product for continuing a running script after modification, the computer-program product including a computer-readable storage medium having program instructions embodied therewith. The program instructions are executable by a processor to cause the processor to perform a method. A non-limiting example of the method includes detecting that a first script has been modified to an updated script and that the first script is currently running. Further according to the method performed by the processor, a data key point is selected from among a set of data key points available in the first script. At the selected data key point in the first script, a current state of the first script is saved in a storage object external from the first script, responsive to detecting that the first script has been modified. An execution point is selected in the updated script. The current state of the first script is loaded into the updated script. The updated script is run from the execution point, with the current state of the first script.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
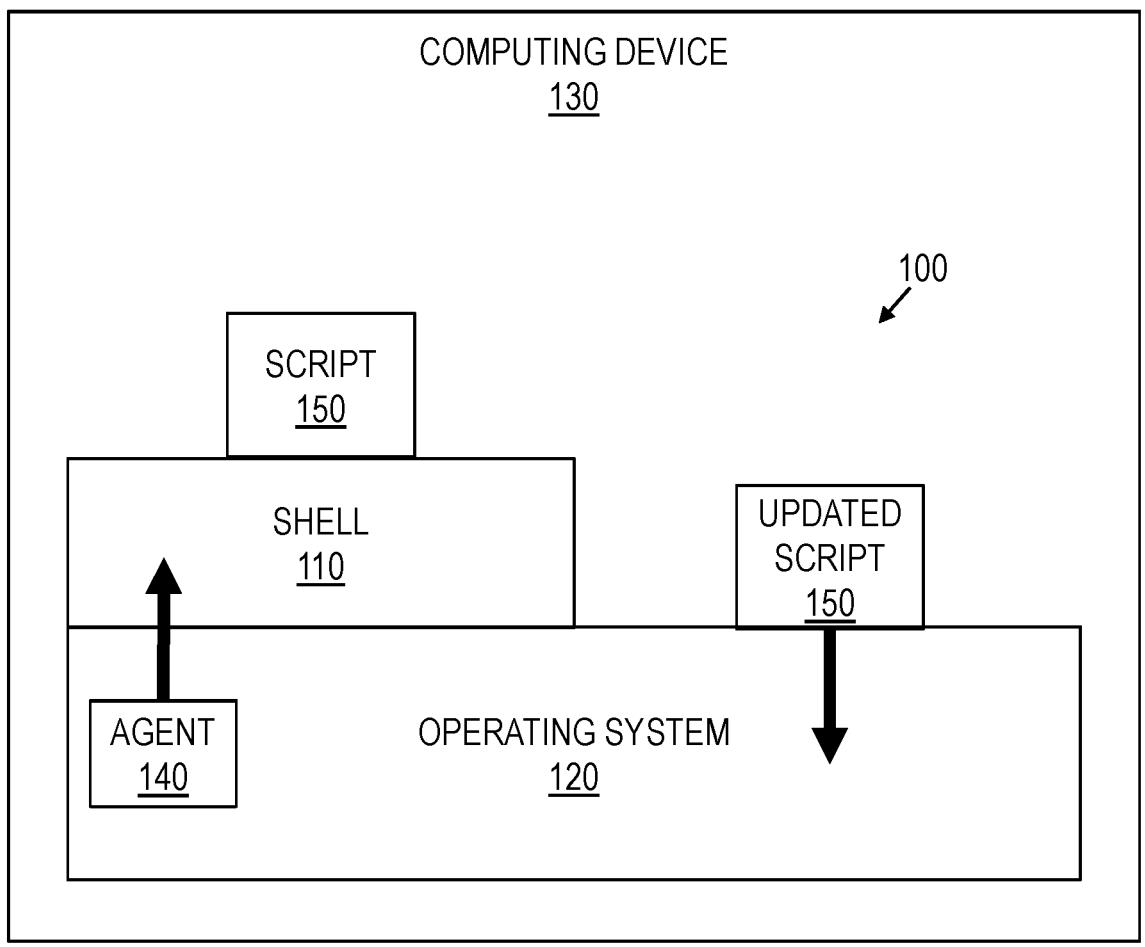
FIG. 1 is a diagram of an execution system for continuing the running of a script after modification of that script, according to some embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, conventionally, there is no way to continue a new version of a script from where an older version ended. When a script is stopped before completion, its current run is abandoned, and its internal data is lost. This can lead to a significant waste of time and computing power when the script has been running for a long time, such as for days or weeks.

Turning now to an overview of the aspects of the invention, one or more embodiments of the invention address the above-described shortcomings of the prior art by enabling script modification in real time. When an executing script is modified, embodiments of the invention automatically detect the modification and prompt the user with options. Specifically, the user may be prompted to select from among the data key points in the running script. At the selected data key point, a state-save statement may dump the values of variables in the script, thus saving the script's state. Embodiments of the invention then load the variable values from the saved state, before starting the new version of the script from a designated point.

The above-described aspects of the invention address the shortcomings of the prior art by saving a current state of the old version of the script by way of a data dump at a data key point. Thus, the new version of the script can be started using that the current state of the old version of the script. As a result, the script can effectively continue running in an updated form, without loss of data.

Turning now to a more detailed description of aspects of the present invention, FIG. 1 is a diagram of an execution system 100 for continuing the running of a script after modification of that script, according to some embodiments of the invention. As shown, in some embodiments of the invention, the execution system 100 is integrated with, or in communication with, a shell 110. Further, in some embodiments of the invention, an operating system (OS) 120 of a host computing device 130 also participates in the execution system 100, as described below. In some embodiments of the invention, to perform the operations described herein, the execution system 100 incorporates an agent 140, or daemon, in the OS 120, such as in the filesystem of the OS 120. The operations described herein as being performed by the OS 120 may thus be performed by the agent 140 running in the OS 120. In some embodiments of the invention, if an agent 140 is included in the OS 120, that agent 140 has limited permissions, such that it is excluded from monitoring or interfering with aspects of the OS 120 that do not relate to embodiments of this invention.

Generally, in some embodiments of the invention, a script 150 runs in the shell 110. When the script is modified to a new version, the shell 110 may detect the modification, resulting in an updated script 150. More specifically, this detection may involve notification from the OS 120 or from a user that a modification to a running script 150 has been made. The shell 110 may then prompt the user to select a data key point in the running script 150. At the selected data key point, the running script 150 saves the current state of its variables in a dump. The new version of the script 150 may have a corresponding data key point or other execution point, and the shell 110 may begin running the new version of the script 150 at that data key point or other execution point, with data loaded from the dump of the old version. These operations will be described in more detail below.

It will be understood by one skilled in the art that embodiments of the invention are not limited to a shell 110. Rather, embodiments of the invention can apply to various interpreted languages. One of skill in the art will understand how to modify the operations described herein so as to apply those operations to other interpreted languages.

In some embodiments of the invention, the execution system 100 may detect when a running script 150 has changed. This may be performed in various ways. For instance, the shell 110 is aware of which scripts 150 are currently running. The shell 110 may notify the OS 120 of which scripts 150 are running. When a script 150 is saved with the same name of a running script, the OS 120 may perform the save operation and may notify the shell 110 that a running script 150 has changed. For another example, a user may simply notify the shell 110 that a running script 150 has been modified. It will be understood that the new version of the script 150 need not be directly based on the old version. For instance, the new version may have been built from scratch or from a different script 150, rather than being a direct update to the old version of the script 150. Further, in some embodiments of the invention, non-substantive changes to scripts 150 may be ignored. For example, the shell 110 or the OS 120 may compare the new version of the script 150 to the old version to determine whether the changes include only comments, or whether the actual functionality has been changed. If the changes are only comments, for example, then the shell 110 may determine that no change to the script 150 has been made.

Each script 150 may be written to include one or more data key points. However, if a data key point is not written into a script 150, the shell 110 may prompt for a data key point before running the script 150, as will be described further below. Generally, a data key point is a point at which the values of variables in the script 150 can be saved. A data key point is a data snapshot including the values of all variables. In some embodiments of the invention, a data key point is implemented as, at least, a state-save statement in the script 150, which is a statement that saves externally, or dumps, the current values of variables in the script 150. These current values of the variables may represent a saved state of the script 150. For example, and not by way of limitation, the saved state may be saved to a storage area, such as in a file or other storage object in memory or on disk. The storage area may be reserved or dynamically allocated, for example. The format of the saved state may vary, but generally, the shell 110 may be familiar with the format and, thus, may be able to match up each variable with its corresponding variable upon reading the saved state.

In some embodiments of the invention, a data key point differs from a traditional break point and a traditional interrupt point. A break point is a location at which a program breaks for debugging purposes, but it is not possible to start a new program based on the break point. An interrupt point is a point at which an interrupt service routine is performed, but like a break point, an interrupt point does not enable a new program to be started based on the interrupt point.

Before the shell 110 begins running a script 150, the shell 110 may search the script 150 for data key points. In some embodiments of the invention, a standard flag may be used in a script 150 to notify the shell of the location of each data key point. For example, and not by way of limitation, the locations of the data key points in the script 150 may be specified in a header of the script 150, or each data key point may include a preestablished string to identify it as a data key point. If the shell 110 does not detect any data key points, prior to running the script 150, the shell may prompt the user to specify one or more data key points.

For example, and not by way of limitation, the user may specify a data key point by line number. Upon receiving a location of a data key point, the shell 110 may add that data key point to the script 150. This may be performed in various ways. Such as, for example, by inserting a state-save statement at the line number specified by the user. In some embodiments of the invention, the shell 110 checks for data key points, and prompts the user to add a data key point if none are found, regardless of whether the script 150 is a new script 150 (i.e., is not an updated script 150 being run in place of an outdated script 150) or an updated script 150 being started to continue the run of a script 150 that was modified. Further, in some embodiments of the invention, the shell 110 prompts the user to add one or more data key points regardless of whether existing data key points are found in the script 150, thus enabling the user to update the set of available data key points if desired.

An execution point is a designated point at which a new version of a script 150, also referred to herein as an updated script 150, begins running. An execution point may be a data key point, but alternatively, an execution point can be placed elsewhere in the updated script 150 to enable the updated script 150 to start wherever the user desires. For example, and not by way of limitation, an execution point may be written into a script 150 and implemented as an execution statement. In that case, the execution statement may load the saved state that was extracted from the prior version of the script 150, also referred to herein as the outdated script 150.

Before running an updated script 150, the shell 110 may prompt the user for an execution point, which may be a data key point or some other execution point. In some cases, an updated script 150 may include data key points corresponding to, or matching, data key points in the outdated script 150. If using a data key point as an execution point, execution of the updated script 150 may begin after the corresponding save-state statement of that data key point, if a save-state statement is written into the updated script 150. For instance, the outdated script 150 may include one or more data key points, the updated script 150 may include one or one or more data key points, and each data key point in the outdated script 150 may correspond to a data key point in the updated script 150. The correspondence may be indicated to the shell 110 in various ways, such as by way of comments or other labeling in the scripts 150 themselves. Unless instructed otherwise, when instructed to stop an outdated script at a certain data key point, the shell 110 may seek a corresponding data key point in the updated script to use as an execution point. However, the shell 110 may give the user the opportunity to select an alternative execution point.

The shell 110 may enable the user to select an execution point for an updated script 150. For example, and not by way of limitation, the user may specify an execution point by line number. Upon receiving a location of the execution point, the shell 110 may load the saved variable values from the outdated script 150 and may run the updated script 150 from the selected location. For instance, if the execution point is not already written into the updated script 150, this may be performed by inserting an execution statement into the updated script 150 at the indicated location and then running the updated script 150 from that location.

By enabling the user to enter a data key point when starting a script 150, and by enabling the user to enter an execution point for an updated script 150, the execution system 100 is able to provide backward compatibility. A script 150 written for the execution system 100 described herein may include one or more data key points or execution points, while a script 150 not written for the execution system 100 is not likely to include these. However, by prompting the user to add a data key point or an execution point as needed, the execution system 100 may be capable of continuing the run of scripts 150 that were not designed for the execution system 100.

Figure 2A:
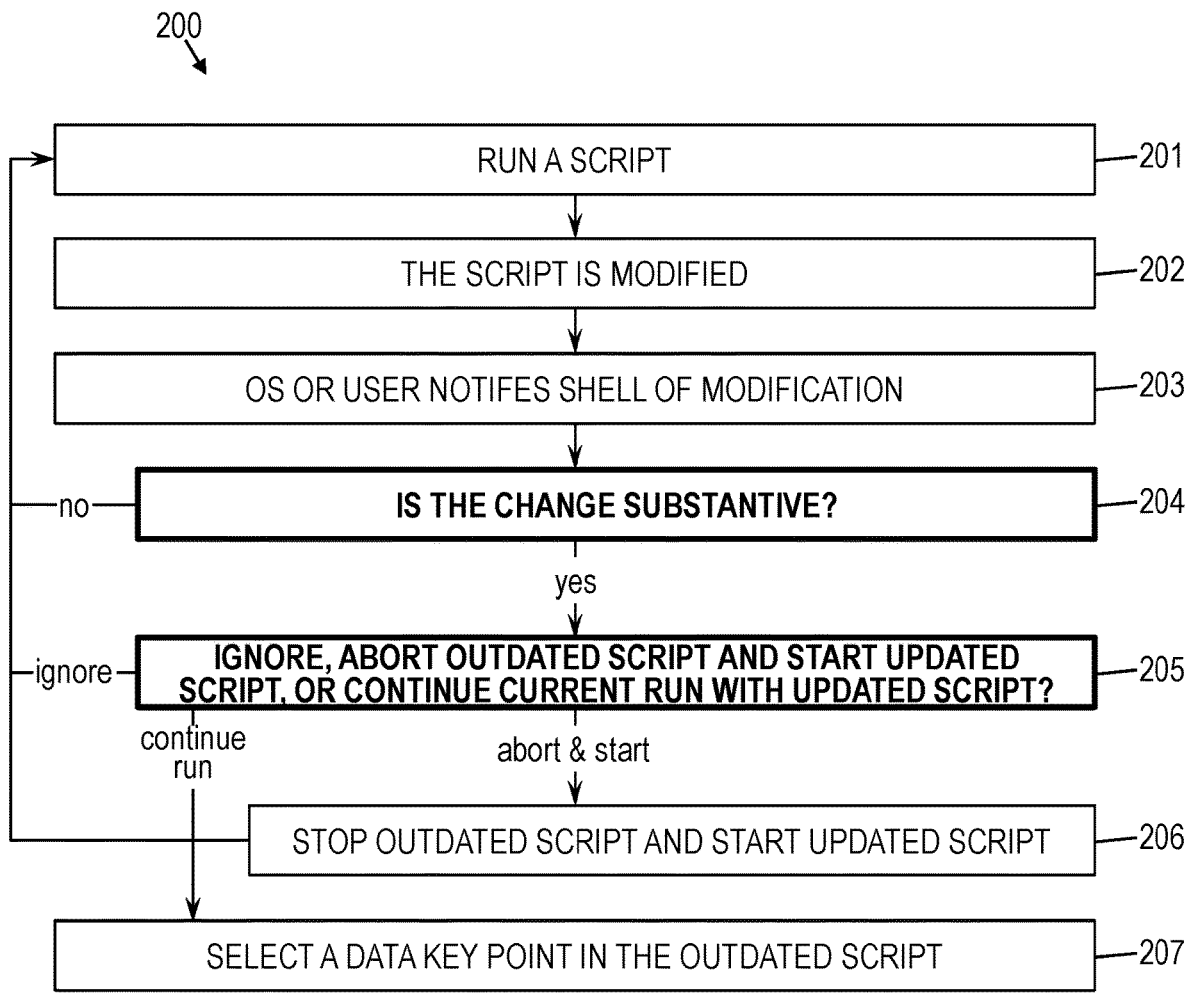
FIGS. 2A-2B together are a flow diagram of a method of continuing the running of a script after modification of that script, according to some embodiments of the invention.
Figure 2B:
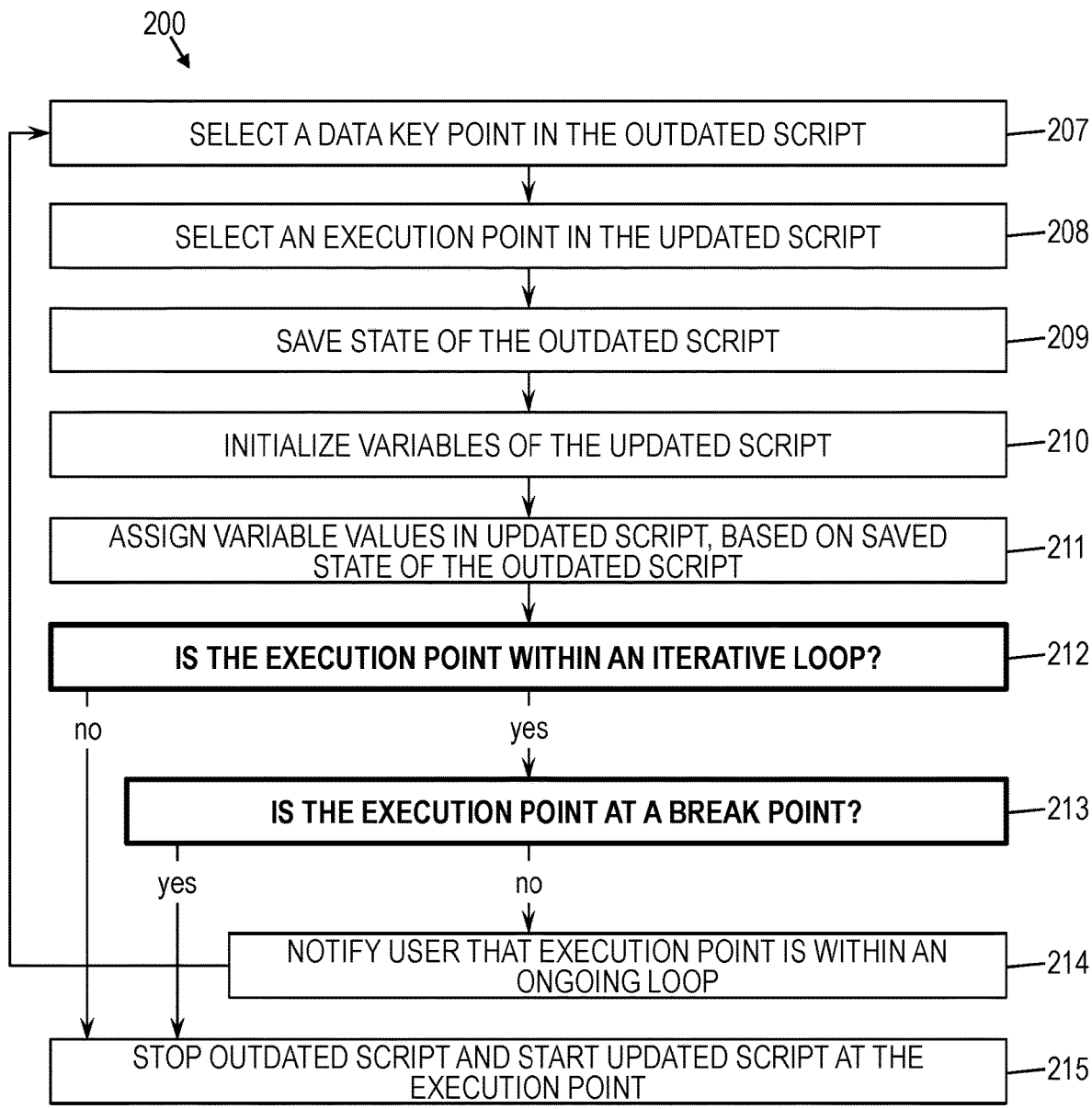

FIGS. 2A-2B together are a flow diagram of a method 200 of continuing the running of a script 150 after modification of that script 150, according to some embodiments of the invention. It will be understood by one skilled in the art that the blocks of this method 200 do not limit the scope of the various embodiments of the invention.

As shown in FIG. 2A, at block 201 of the method 200, the shell 110 is running a script 150. At this point, in some embodiments of the invention, it can be assumed that the running script 150 includes one or more data key points, as the shell 110 would have prompted the user to add a data key point if none existed. At block 202, the running script 150 is modified, thereby making the running script 150 an outdated script 150.

At block 203, either the user or the OS 120 notifies the shell 110 of the update to the running script 150. For instance, upon performing a file save operation for a script 150 with the same filename as a running script 150, the OS 120 may notify the shell 110 of the save. This notification by the user or the OS 120 may include a filename, or other identifier, of the running script 150 that has been outdated, which may be useful information to the shell 110 if the shell 110 is running multiple scripts 150. In some embodiments of the invention, the updated script 150 is required to have the same name as the outdated script 150, or alternatively, when notifying the shell 110 of the updated script 150, the user or the OS 120 may indicate the filename of the outdated script 150 as well as the filename of the updated script 150.

At decision block 204, the shell compares the updated script to the outdated script to determine whether the change is substantive (e.g., is a change to functionality rather than to just comments). If the change is not substantive, then the shell 110 may ignore the change, and the method 200 thus returns to block 201, where the current script 150 continues running.

However, if the change is substantive, then at decision block 205, the shell 110 may prompt the user for a selection of one of the following: ignore the change and continue running the outdated script 150, abort the outdated script 150 and run the updated script 150 from scratch, or continue the current run with the new script 150. If the user opts to ignore the change, then the method 200 returns to block 201, where the outdated script 150 continues running without modification. If the user opts to abort the outdated script 150 and start the updated script 150 from scratch, then at block 206, the outdated script 150 is aborted and the updated script 150 is started. In that case, the method 200 returns to block 201, where the updated script 150 continues to run.

However, if the user opts to continue the current run with the updated script 150, then at block 207, the shell 110 selects a data key point existing in the outdated script 150. More specifically, for instance, the shell 110 may prompt the user for a selection of the data key point, and the shell 110 may utilize the data key point selected by the user. This data key point may have been written into the outdated script 150 by the user, or it may have been established by the shell 110 before running the outdated script 150. However, in some embodiments of the invention, at this point, one or more data key points already exist in the outdated script 150 that is currently running. Block 207 appears in both FIG. 2A and FIG. 2B.

At block 208, which appears in FIG. 2B, the shell 110 selects an execution point in the updated script 150. More specifically, for instance, the shell 110 may prompt the user for a selection of the execution point, and the shell 110 may utilize the execution point selected by the user. If no execution points are written into the updated script 150, then the shell 110 may enable the user to indicate a new execution point.

At block 209 of FIG. 2B, the shell 110 saves the state of the outdated script 150 at the selected data key point. In some embodiments of the invention, the selected data key point includes a state-save statement in the outdated script 150, and this save-state statement enables the outdated script 150 to dump the values of its variables. This may result in the values of internal variables of the outdated script 150 being saved to a source external to the outdated script 150.

At block 210, the shell 110 initializes the variables in the updated script 150 that are referenced prior to the selected execution point. At block 211, for each variable indicated in the saved state of the outdated script 150, the shell 110 may assign each such variable the associated value indicated in the saved state. In some embodiments of the invention, it is assumed that the updated script 150 and the outdated script 150 utilize the same variable names, and thus, the matching of values to variables may be based on variable names. It will be understood that, although all values indicated in the saved state may be assigned to the corresponding variables of the updated script 150, it is not necessarily the case that every variable in the updated script 150 has a corresponding value in the saved state. For instance, a variable may be introduced in the updated script 150 that did not exist in the outdated script 150, or a variable may not yet have been used in the outdated script 150 and thus has no corresponding value in the saved state.

In some embodiments of the invention, the execution system 100 prevents starting the updated script 150 within an ongoing iterative loop. To this end, at decision block 212, based on parsing the updated script 150, the shell 110 determines whether the selected execution point is within a loop. If the execution point is not within a loop, then the method 200 skips ahead to block 215. However, if the execution point is within a loop, then the method 200 proceeds to decision block 213. At decision block 213, the shell 110 determines whether the execution point is at a break point in the loop. For example, and not by way of limitation, making this determination may require the shell 110 to test the current variable values, as stored in the saved state of the outdated script 150 and as now assigned to corresponding variables in the updated script 150, to determine whether a condition statement in the updated script 150 is met for breaking the loop. If the execution point is not a break point of the loop, then at block 214, the shell 110 notifies the user that the execution point lands within an ongoing loop and, thus, a loop mismatch may exist. The method 200 then returns to block 207 to select another data key point in the outdated script 150 and another execution point in the updated script 150.

However, if the execution is not within a loop or is the break point of a loop, then the method 200 proceeds to block 215. At block 215, the shell 110 stops the outdated script 150 and starts the updated script at the execution point. The updated script 150, therefore, continues running with a state inherited from the outdated script 150. As a result, a script 150 can effectively continue running in the shell 110 after that script 150 has been modified.

Figure 3:
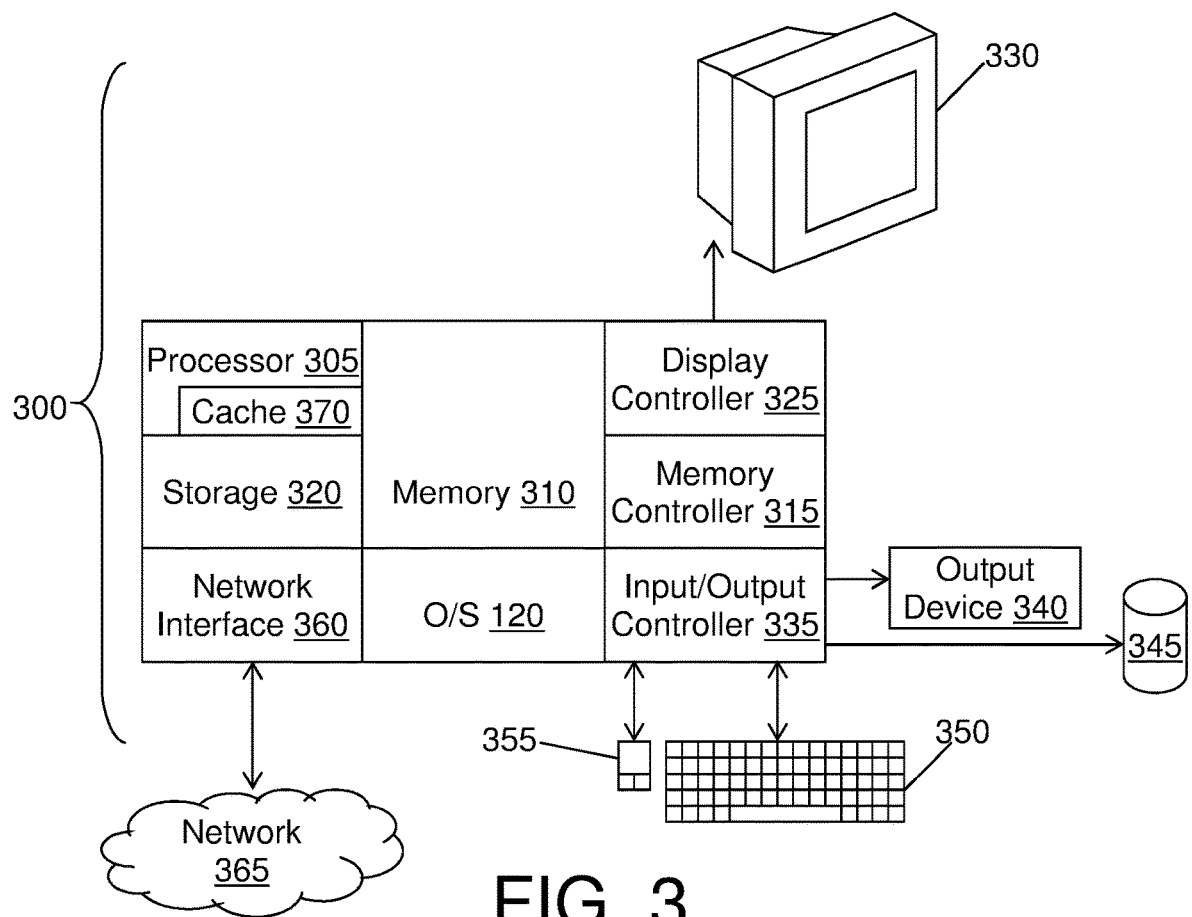
FIG. 3 is a block diagram of a computer system for implementing some or all aspects of the execution system, according to some embodiments of this invention.

FIG. 3 is a block diagram of a computer system 300 for implementing some or all aspects of the execution system 100, according to some embodiments of this invention. The execution systems 100 and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer. For example, and not by way of limitation, the computing device 130 on which the execution system 100 runs may be a computer system 300 as shown in FIG. 3.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor-based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable OS 120. The OS 120 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid-state drive. The stored instructions in memory 310 or in storage 320 may include those enabling the processor to execute one or more aspects of the execution systems 100 and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Execution systems 100 and methods according to this disclosure may be embodied, in whole or in part, in computer program products or in computer systems 300, such as that illustrated in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   detecting that a first script has been modified to an updated script and that the first script is currently running;
   prompting a user to identify a location of a new data key point in the first script;
   adding the new data key point to the location in the first script, wherein the new data key point enables a state of the first script to be saved to a location external from the first script;
   selecting a data key point from among a set of data key points available in the first script, the set of data key points comprising the new data key point;
   at the selected data key point in the first script, saving a current state of the first script in a storage object external from the first script, responsive to detecting that the first script has been modified;
   selecting an execution point in the updated script;
   loading, into the updated script, the current state of the first script; and
   running the updated script from the execution point, with the current state of the first script.

2. The computer-implemented method of claim 1, further comprising:
   receiving an instruction to continue a current run of the first script by replacing the first script with the updated script;
   wherein the running the updated script from the execution point, with the current state of the first script, is responsive to the instruction.

3. The computer-implemented method of claim 1, wherein each data key point in the set of data key points comprises a save-state statement that saves a state of the first script to a location external from the first script.

4. The computer-implemented method of claim 1, wherein:
   the saving the current state of the first script in the storage object comprises saving to the storage object a respective value associated with each variable of a plurality of variables referenced in the first script; and
   the loading, into the updated script, the current state of the first script comprises assigning, to each variable of the plurality of variables in the updated script, the respective value saved in the storage object.

5. The computer-implemented method of claim 1, wherein the selecting the execution point in the updated script comprises:
   receiving a selection of an other execution point;
   detecting that the other execution point falls within an ongoing iterative loop in the updated script;
   prompting selection of an alternative execution point in place of the other execution point; and
   receiving from a user a selection of the execution point.

6. The computer-implemented method of claim 1, wherein the detecting that the first script has been modified to the updated script comprises receiving from an operating system a notification that the first script has been modified to the updated script.

7. A system comprising:
a memory having computer-readable instructions; and
one or more processors for executing the computer-readable instructions, the computer-readable instructions comprising:
   detecting that a first script has been modified to an updated script and that the first script is currently running;
   selecting a data key point from among a set of data key points available in the first script;
   at the selected data key point in the first script, saving a current state of the first script in a storage object external from the first script, responsive to detecting that the first script has been modified;
   selecting an execution point in the updated script, wherein selecting the execution point in the updated script comprises:
      receiving a selection of an other execution point;
      detecting that the other execution point falls within an ongoing iterative loop in the updated script;
      prompting selection of an alternative execution point in place of the other execution point; and
      receiving from a user a selection of the execution point loading, into the updated script, the current state of the first script; and
   running the updated script from the execution point, with the current state of the first script.

8. The system of claim 7, the computer-readable instructions further comprising:
   receiving an instruction to continue a current run of the first script by replacing the first script with the updated script;
   wherein the running the updated script from the execution point, with the current state of the first script, is responsive to the instruction.

9. The system of claim 7, the computer-readable instructions further comprising:
   receiving an instruction to run the first script;
   prompting a user to identify a location of a new data key point in the first script; and
   adding the new data key point to the location in the first script, wherein the new data key point enables a state of the first script to be saved to a location external from the first script.

10. The system of claim 7, wherein each data key point in the set of data key points comprises a save-state statement that saves a state of the first script to a location external from the first script.

11. The system of claim 7, wherein:
   the saving the current state of the first script in the storage object comprises saving to the storage object a respective value associated with each variable of a plurality of variables referenced in the first script; and
   the loading, into the updated script, the current state of the first script comprises assigning, to each variable of the plurality of variables in the updated script, the respective value saved in the storage object.

12. The system of claim 7, wherein the detecting that the first script has been modified to the updated script comprises receiving from an operating system a notification that the first script has been modified to the updated script.

13. A computer-program product for continuing a running script after modification, the computer-program product comprising a computer-readable storage medium having program instructions embodied therewith, the program instructions executable by a processor to cause the processor to perform a method comprising:
   receiving an instruction to run a first script;
   prompting a user to identify a location of a new data key point in the first script;
   adding the new data key point to the location in the first script, wherein the new data key point enables a state of the first script to be saved to a location external from the first script;
   detecting that the first script has been modified to an updated script and that the first script is currently running;
   selecting a data key point from among a set of data key points available in the first script, the set of data key points comprising the new data key point;
   at the selected data key point in the first script, saving a current state of the first script in a storage object external from the first script, responsive to detecting that the first script has been modified;
   selecting an execution point in the updated script;
   loading, into the updated script, the current state of the first script; and
   running the updated script from the execution point, with the current state of the first script.

14. The computer-program product of claim 13, the method further comprising:
   receiving an instruction to continue a current run of the first script by replacing the first script with the updated script;
   wherein the running the updated script from the execution point, with the current state of the first script, is responsive to the instruction.

15. The computer-program product of claim 13, wherein each data key point in the set of data key points comprises a save-state statement that saves a state of the first script to a location external from the first script.

16. The computer-program product of claim 13, wherein:
   the saving the current state of the first script in the storage object comprises saving to the storage object a respective value associated with each variable of a plurality of variables referenced in the first script; and
   the loading, into the updated script, the current state of the first script comprises assigning, to each variable of the plurality of variables in the updated script, the respective value saved in the storage object.

17. The computer-program product of claim 13, wherein the selecting the execution point in the updated script comprises:
   receiving a selection of an other execution point;
   detecting that the other execution point falls within an ongoing iterative loop in the updated script;
   prompting selection of an alternative execution point in place of the other execution point; and
   receiving from a user a selection of the execution point.

* * * * *